UNITED STATES PATENT OFFICE.

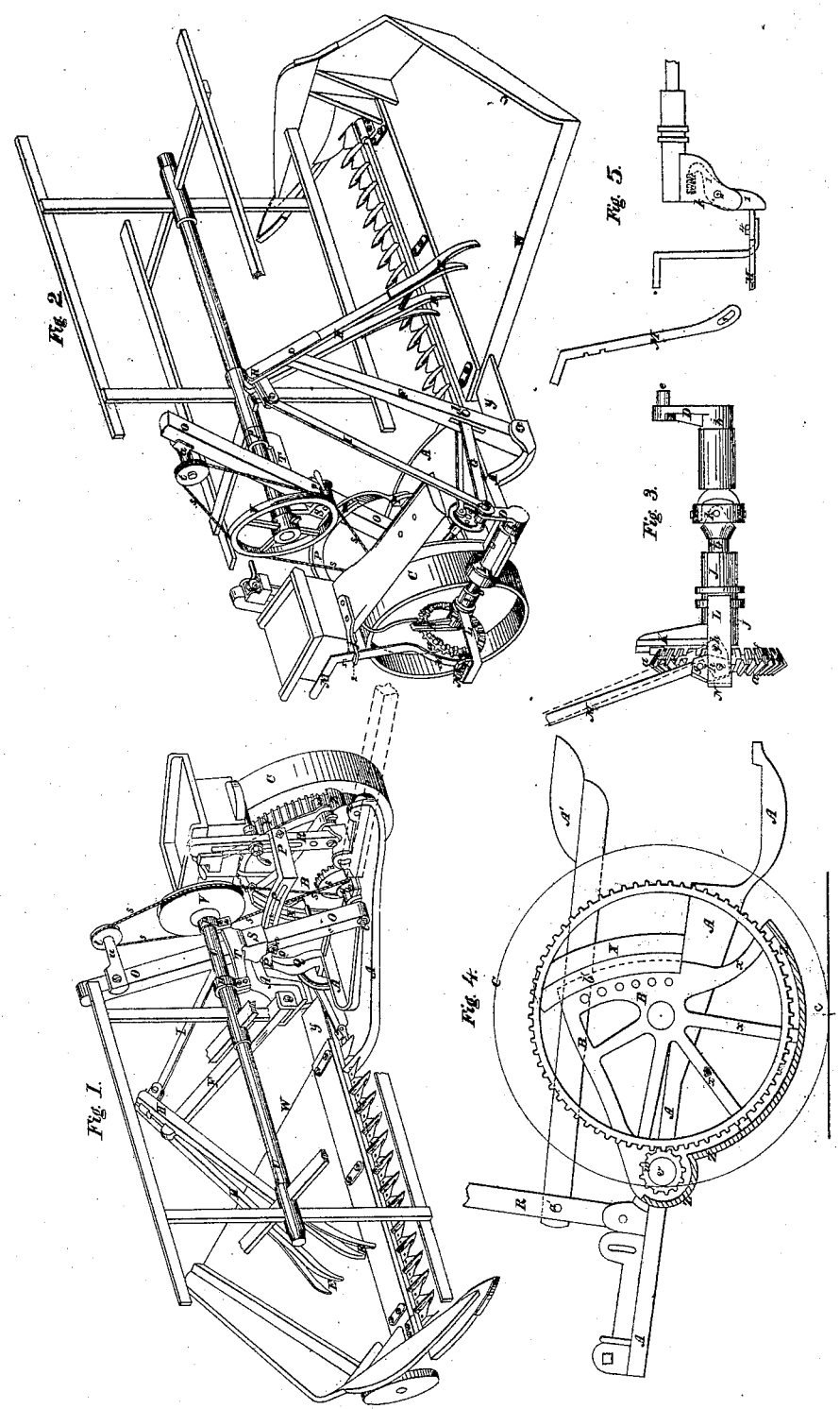

WM. A. KIRBY, OF BUFFALO, ASSIGNOR TO HIMSELF AND DAVID M. OSBORNE, OF AUBURN, NEW YORK.

IMPROVEMENT IN HARVESTING-MACHINES.

Specification forming part of Letters Patent No. 32,736, dated July 2, 1861.

*To all whom it may concern:*

Be it known that I, WILLIAM A. KIRBY, of Buffalo, in the county of Erie and State of New York, have invented certain new and useful Improvements in Harvesting-Machines and the Raking Apparatus thereof; and I do hereby declare the following to be a full, clear, and exact description of the construction and operation of the same, reference being had to the accompanying drawings, making a part of this specification, in which—

Figure 1 represents a perspective view of the machine in front, looking obliquely toward the main frame and driving-gear from the outer end of and in advance of outside divider. Fig. 2 represents a perspective view from the rear of the main frame, and looking toward the outside divider. Fig. 3 represents a portion of the rake-gearing detached, and on an enlarged scale to better show its action. Fig. 4 represents a side view of the main frame and main drive-wheel to show the manner of arranging the shields on the frame to protect the gearing that runs close to the ground.

Similar letters of reference, where they occur in the several figures, denote like parts of the apparatus in all the drawings.

There are many of the features of this machine which are already secured to me or my assignees by Letters Patent, and I shall therefore refer to them no further than is necessary to illustrate the new elements which I have attached to my machine.

My present invention relates more especially to the gathering and delivering of the grain in good compact bundles upon the ground by an automatic rake, which is, however, always under the control of the driver, and, as incidental to the gathering, I include the reel, which puts the cut grain within the reach of the rake; and it further relates to the manner of shielding the gearing that runs near to the ground, as will be hereinafter more particularly pointed out in describing the motions or adjustments of the machine.

The nature of my invention consists, first, in the employment, in a reaping-machine that has an automatic rake connected with it, of two connecting-rods working from one crank, in combination with a hinged and reaching post that carries the rake, so that a compound motion may be given to the rake that will lift it up out of the way of the falling grain, in passing to the divider side of the platform, and drop it down beside the outside divider, and carry it straight across the platform parallel with the finger-bar when sweeping the grain from the platform.

My invention further consists in locating the hinged rake-post on the frame of the machine and inclining it rearward for the purpose of throwing the rake back from and out of the way of the falling grain as it passes to the divider side of the platform, and allowing it to descend as it moves toward that point, which brings it into the most favorable position for taking the grain and sweeping it off the platform on its return motion.

My invention further consists in making a universal joint between the driving-gear and the rake, so that as the cutters are raised or lowered on the main frame the rake, which is on the main frame, may conform to them and keep itself adjusted to the platform.

My invention further consists in a mechanism for throwing the rake out of and into motion at each revolution, and at a particular point in the revolution, so as not to disturb the falling grain until enough is collected on the platform to form a proper gavel.

My invention farther consists in placing a guard or shield rigidly upon the plate or supplementary frame to which the driving-wheel is attached, and passing it under and partially around the gearing attached to said wheel, so that it shall always retain the same relative position to said wheel and gearing when the position of the main frame and finger-bar are changed for cutting high or low, the purpose of the guard or shield being to keep the gearing clear of dirt and stones or other obstructions.

To enable others skilled in the art to make and use my invention, I will proceed to describe the same with reference to the drawings.

A represents a main frame, to which the finger-bar, cutting apparatus, platform, reel, and a portion of the driving-gear are connected, and B is a supplemental or segmental frame pivoted to the main frame A, this frame B having the main driving and supporting wheel C, as well as the driver's seat, connected with it, and likewise some of the gearing. These things are shown, described, and some of them claimed in patents heretofore granted to me, and need not be referred to in detail in this specification.

There is attached to the main drive-wheel C a bevel-pinion that turns with the drive-wheel. This pinion gears into and turns a bevel-gear, $a$, on one end of a shaft, $b$, the other end of said shaft having a crank, D, upon it for operating the rake E as follows: A rake-post, F, is hinged at $c$ to a projecting portion of the main frame A, the hinge-joint being so arranged as that said rake-post may swing toward and from the grain side of the platform, but not in the line of the motion of the machine. A connecting rod or bar, G, is pivoted to the rake-post F at the point $d$, and its other end is pivoted to the wrist-pin $e$ of the crank D, so that this crank and connecting-rod define the swinging motion of said rake-post—that is to say, the extent of its motion.

To the top of the rake-post is pivoted the shank or handle H of the rake or fork E, this shank extending beyond its pivoted point, and at or near its end having a pitman, I, connected with it, which pitman also extends to and is connected with the wrist-pin $e$ of the crank D, so that the crank D gives a compound motion to the rake by swinging the rake-post toward and from the outside divider or fence by means of the pitman G, and causing it to rise and fall, and then be drawn back over the platform, mainly by the pitman I, but partially by the pitman G. The fork, in going toward the outside divider, first rises and advances in a curved line and then descends to the outer side of the platform, but in returning it sweeps the stalks off from the platform, leaving them in a compact gavel on the ground. If the rake were allowed a continuous motion, the gavels gathered by it would be of different sizes and in bad condition to be bound, and hence I have arranged so that the rake shall be thrown out of motion at every revolution of its gear-wheel, and be held out of motion, at the will of the driver or conductor, until sufficient grain has accumulated on the platform to make the proper-sized gavel, when it is thrown into action again and sweeps the platform. This I do as follows: On the back of the bevel-gear $a$ there are a series of teeth or notches, $f$, and upon the shaft $b$ there is a sleeve or boss, J, which has an arm, K, upon it, and this boss and arm are thrown up toward the teeth of the wheel $a$ by a spring, L. The boss has grooves cut in it which slip over or upon feathers on the shaft $b$, and when the arm K is in one of the notches $f$ the shaft $b$ is set in motion and operates the rake; but when the arm K is thrown out of its notch, or any of them, it moves the boss back and uncouples the gear $a$ from the shaft $b$, and the rake stops instantly, although the gear $a$ continues to run with the main drive-wheel.

To throw out the arm K, I use a lever, M, which extends from near the driver's seat to a point near the perimeter of the gear $a$, where it is hinged, as at $g$, to a toggle-trigger, $h$, which is pivoted at $i$ to the supporting-piece N, so that when the lever M is in the position shown in Fig. 1, and in black in Fig. 4, the rake will continue to run; but when the lever M is dropped, as shown in red in Fig. 3, the trigger $h$ is thrown out, so that when the arm K comes around to it it (the arm) shall come in contact with the trigger and be forced out of its tooth in the wheel and rest upon the trigger, instantly stopping the rake-shaft and crank and the rake itself. When enough stalks have accumulated on the platform to make a gavel, the driver again draws up the lever M, and the arm K, being released, is thrown into one of the notches $f$ by the spring L and the rake is again in motion. There is a guide-arm, $j$, near the upper end of the lever M, and two notches, 1 2, in the lever itself. If the lever be secured to the guide $j$ by its notch 1, the rake will be thrown out of action, and remain out so long as this notch is used. If the lever be secured by its notch 2 to the guide $j$, the rake will be in action, and so remain as long as this union is used. Thus the driver can control the motion of the rake at his will, either keeping it in or out of action constantly or periodically, as circumstances may require.

I have heretofore mentioned that my rake-post was connected to the main frame, and yet it is driven from the main wheel, which is on the supplemental frame, and my main frame is raised and lowered and sometimes left free to raise and lower itself in conforming to the inequalities in the surface of the ground, or fixing the height at which the cutters are to work. This being the case, provision had to be made to allow the fork or rake to follow the platform as it was raised or lowered, and without cramping its gear which was not correspondingly raised and lowered. I accomplish this by means of a universal joint, $k$, in the rake-shaft $b$, which allows the two frames all their requisite play or adjustment and leaves the rake free to accommodate itself to the platform at any of its positions.

O is the reel-post. It is bolted to the main frame at $l$, so that it may, when necessary to swing the reel farther into, toward, or from the standing grain, be moved on this bolt or fastening. A guide and supporting piece, P, is connected to the main frame, or to uprights Q R on the main frame, and has a curved slot, $m$, in it, so that by means of a nut and bolt, $n$, the reel-post may be adjusted and supported by this guide-piece. This makes the reel-post rigid and firm when adjusted, and the nuts run up onto the bolts.

Upon the reel-post is fixed or placed a buckle or slide, S, which for convenience is clamped to the post at any proper height by a cam-lever, $o$, which makes the slide easily adjustable on the reel-post. A yoke, T, is formed on or connected to this slide, that has two bearings, $p\ p$, one upon each of its ends, in which the reel-shaft U is supported and turns. I thus avoid the use of an outside reel-support.

The reel-shaft and the reel are driven from a pulley, $q$, by means of an endless-belt, $s$, passing around it, and around a loose pulley, $t$, on an arm, $u$, near the top of the reel-post. The pulley V on the end of the reel-shaft being much larger than the pulleys $q\ t$, the belt $s$ pinches into the groove of the reel-shaft pulley V with sufficient friction to drive it, and when the reel is raised or lowered the belt will continue to drive it without any adjustment of the belt; nor will the tension of the belt $s$ be changed by turning the reel-post on its bolt $l$, as said bolt is concentric with the pulley $q$.

The rake or fork E traverses parallel to and just behind the finger-bar, so that it comes against the butt-ends of the straws and sweeps them toward the gaveling-space at the main-frame side of the platform, and this side W is made oblique, so that the heads of the stalks which lie toward the rear of the platform will lie toward the rear of the platform will arrive at the edge thereof while the butt-ends are still on the receiver $y$ or platform, and the moment the heads come in contact with the stubble, the machine advancing, the gavel is drawn off onto the ground in good shape for binding, or rather the stubble holding onto the heads, the machine passes out from under the gavel, and hence there is no dribbling of the straws, as is the case when the gavel is thrown off by mechanism that is advancing with the machine and continues to deliver as it advances.

The supplemental frame B, that carries the drive-wheel C, is pivoted or hinged to the main frame at a point, $v$, which point is also the center of the pinion $w$, that is driven by the main drive-wheel, so that the latter, as it rises and falls, rolls around the pinion and always keeps in gear with it. The rear of the supplemental frame is an arc of a circle and moves in or against an arc, X, on the main frame, so that by means of a pin the two frames may be held or their motion controlled, or by the removal of the pin move independently of each other, as either may happen to be influenced by the ground over which they or any of their connected parts may for the time being be moving. The cogged gear Y on the drive-wheel C runs close to the ground and is liable to be injured by stones or other obstructions, or to become clogged with dirt, straws, grass, &c. So, also, the pinion $w$ is liable to damage, and particularly to catching and winding up straws, grass, &c., and I have devised a guard or shield to protect it from these contingencies. This guard or shield could not be in the main frame, because the drive-wheel rises and falls independent of said main frame; or said main frame must be raised and lowered sometimes on the auxiliary frame to regulate the height of the cutters, and one would interfere with or fail to be a protection to the other.

I cast or permanently attach to the supplemental frame, by means of arms $x$, the shield Z, which curves around in close proximity to the periphery of the cog-gear Y and protects it from injury or from clogging. The shield is extended around the pinion $w$ to protect it also. This can be done, notwithstanding this pinion is on the main frame, because the center of motion of the supplemental frame, to which the shield is attached, and the center motion of the pinion are one and the same; and hence the curved shield around the pinion will always have a fixd position in relation to said pinion, however much the two frames may play or be moved one upon the other, their center of motion being also at $v$.

There are several other parts of the machine which I have not described, as it would make the specification very lengthy; but they are shown in the drawings, and are described and some of them claimed in other patents granted to me, and hence I omit them here.

By using an overhanging reel, as herein described, I dispense with the use of any reel-supporter on the divider side of the machine in which the grain may become entangled, and whereby the free passage of the machine is obstructed.

When the machine is to be used without the rake attachment, a raker-seat, A′, may be attached to the machine, as represented in Fig. 4, the front end of the seat-supporter being secured to the standard R by means of the bolt $a'$, and said supporter resting also on the frame of the machine at $b'$.

In Fig. 5 I have represented a modification of the devices for throwing the rake in and out of gear with the machine. A spring-lever, 1, is pivoted at 2 to the crank K. The end of this spring-lever is pressed in between the cogs $f$ of the bevel-wheel $a$, and is disengaged from said bevel-wheel by means of the lever M, the lower end of which is provided with a cam-slot, 3, through which the bolt 4 passes. By this arrangement I dispense with the piece $h$, Fig. 3.

Having thus fully described the nature and object of my invention, what I claim therein as new, and desire to secure by Letters Patent, is—

1. In combination with an automatic rake in a reaping-machine, a hinged reaching-post and two connecting-rods operated from one and the same crank for the purpose of giving said rake its motions, substantially as herein described.

2. Hinging and supporting the rake-post on the main frame and inclining it backward, so that the rake will be out of the way of the falling grain when at rest, and be raised high enough as it moves toward the outside divider to avoid the falling grain and drop beyond the stalks on the platform, preparatory to sweeping them off, substantially as described.

3. In combination with a rake-post on the main frame and the rake-driving shaft supported at one end on a supplemental frame, the two frames having motions independent of each other, the universal joint $k$ in the rake-shaft for the purpose of preventing cramping in the gearing, substantially as described.

4. In combination with an automatic rake, the lever, trigger, and clutch-arm, substantially as described, so that the driver at his seat may stop or set the rake in motion at his will, or set the trigger so that it will stop it after making one revolution or operation, as described.

5. Placing or making a guard or shield rigid upon a supplemental frame or plate, to which the driving-wheel is attached, and passing it under and partially around the gearing attached to said wheel to protect it from injury or from being clogged, substantially as described.

WM. A. KIRBY.

Witnesses:
CHAS. H. GARLECK,
JOHN H. OSBORNE.